(12) United States Patent
Chhabra et al.

(10) Patent No.: US 12,461,782 B2
(45) Date of Patent: Nov. 4, 2025

(54) SHARING DATA BETWEEN COMPUTING DEVICES

(71) Applicant: Micron Technology, Inc., Boise, ID (US)

(72) Inventors: Bhumika Chhabra, Boise, ID (US); Swetha Barkam, Meridian, ID (US); Zhao Zhao, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 836 days.

(21) Appl. No.: 17/127,656

(22) Filed: Dec. 18, 2020

(65) Prior Publication Data
US 2022/0197699 A1    Jun. 23, 2022

(51) Int. Cl.
G06F 9/50 (2006.01)
G06F 12/02 (2006.01)
H04L 9/40 (2022.01)

(52) U.S. Cl.
CPC ........ *G06F 9/5011* (2013.01); *G06F 12/0238* (2013.01); *H04L 63/083* (2013.01); *G06F 2212/305* (2013.01)

(58) Field of Classification Search
CPC .................................................. G06F 9/5011
See application file for complete search history.

(56) References Cited

U.S. PATENT DOCUMENTS

| | | | |
|---|---|---|---|
| 7,424,267 B2 | 9/2008 | Eisenbach | |
| 7,965,981 B2 | 6/2011 | Bloebaum | |
| 8,175,529 B2 | 5/2012 | Wakasa | |
| 8,588,693 B2 | 11/2013 | Lazaridis | |
| 8,589,514 B2 | 11/2013 | Duggal | |
| 9,084,089 B2 | 7/2015 | Ng | |
| 9,439,205 B1* | 9/2016 | Lin | H04L 67/12 |
| 2011/0004943 A1* | 1/2011 | Chaganti | G06F 21/6245 726/30 |
| 2014/0281161 A1* | 9/2014 | Chen | G06F 12/0246 711/103 |
| 2016/0378455 A1* | 12/2016 | Lochan | H04L 67/34 717/169 |

(Continued)

FOREIGN PATENT DOCUMENTS

CN     102646081 A     8/2012

*Primary Examiner* — Sisley N Kim
(74) *Attorney, Agent, or Firm* — Brooks, Cameron & Huebsch, PLLC (57) ABSTRACT

Methods and devices related to sharing data between computing devices are described. In an example, a method can include writing a first portion of data to a DRAM on a first computing device, receiving, via a radio of the first computing device, first signaling representing a request to share the first portion of data via a first processing resource of the first computing device with a second processing resource of a second computing device, determining at the first processing resource of the first computing device to share the first portion of data with the second processing resource of the second computing device based on at least one of: a command from a user or data representing user settings stored in non-volatile memory on the first computing device, and transmitting, via the radio of the first computing device, second signaling comprising the first portion of data to the second processing resource of the second computing device.

17 Claims, 4 Drawing Sheets

(56) References Cited

U.S. PATENT DOCUMENTS

| | | | |
|---|---|---|---|
| 2018/0084062 A1* | 3/2018 | Jain | H04L 67/12 |
| 2019/0156056 A1* | 5/2019 | Chavez | G06F 21/6245 |
| 2020/0344443 A1* | 10/2020 | Oyachi | H04N 5/38 |
| 2021/0142798 A1* | 5/2021 | Pulicharla | G06F 40/30 |

* cited by examiner

SHARING DATA BETWEEN COMPUTING DEVICES

TECHNICAL FIELD

The present disclosure relates generally to sharing data between computing devices.

BACKGROUND

A computing device can be a smartphone, a wearable device, a tablet, a laptop, a desktop computer, or a smart assistant device, for example. The computing device can receive and/or transmit data and can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

DETAILED DESCRIPTION

The present disclosure includes methods, apparatuses, and systems related to writing a first portion of data to a DRAM on a first computing device, receiving, via a radio of the first computing device, first signaling representing a request to share the first portion of data via a first processing resource of the first computing device with a second processing resource of a second computing device, determining at the first processing resource of the first computing device to share the first portion of data with the second processing resource of the second computing device based on at least one of: a command from a user or data representing user settings stored in non-volatile memory on the first computing device, and transmitting (e.g., sharing), via the radio of the first computing device, second signaling comprising the first portion of data to the second processing resource of the second computing device.

The DRAM and the non-volatile memory can be included in tiered memory. Tiered memory can include volatile and non-volatile memory to store data based on speed and efficiency demands for the data. In some examples, non-volatile memory in a tiered memory can store data that is generally stored in a volatile memory, which can increase an amount of storage space allocated to a computing device at a lower cost than computing devices that rely solely on volatile memory. The non-volatile memory can include NAND and/or 3D Cross-point. In some examples, the first portion of data can include a video and can be stored in DRAM prior to transmitting (e.g., sharing, streaming, and/or multicasting) the first portion of data and/or the first portion of data can include a document and can be stored in NAND or 3D Cross-point prior to transmitting the document.

The request from the second computing device for first computing device to share data can include credentials of the second computing device. The credentials can be compared to credentials of a number of computing devices on a contact list of the first computing device. The credentials of the number of computing devices on the contact list can be stored in the non-volatile memory of the first computing device, for example. If the credentials of the second computing device match credentials of one of the number of computing devices on the contact list, the first computing device can transmit the portion of data to the second computing device.

The first computing device can allow and/or prevent the second computing device from performing particular operations. For example, the first computing device can prevent the second computing device from deleting the portion of data that was shared with the second computing device, allow the second computing device to delete the portion of data that was shared with the second computing device, prevent the second computing device from modifying the portion of data that was shared with the second computing device, and/or allow the second computing device to modify the portion of data that was shared with the second computing device.

In a number of embodiments, a user can provide commands, user settings, and/or data via the user interface. For example, the user can provide an approval to share the portion of data, terminate sharing the portion of data, provide user settings for sharing data, and/or provide user settings for deleting and/or modifying the portion of data.

The first computing device can send and/or receive data from other computing devices, including the second computing device, via communication devices (e.g., intermediary devices), such as, but not limited to the radio. Signaling including the first and second signaling can include a communication (e.g., a radio signal) that carries data from one location to another. In a number of embodiments, the data can be shared using Bluetooth.

As used herein, "a number of" something can refer to one or more of such things. For example, a number of computing devices can refer to one or more computing devices. A "plurality" of something intends two or more. Additionally, designators such as "X" and "Y", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 100 may reference element "0" in FIG. 1, and a similar element may be referenced as 200 in FIG. 2. In some instances, a plurality of similar, but functionally and/or structurally distinguishable, elements or components in the same figure or in different figures may be referenced sequentially with the same element number (e.g., 200-1, 200-2, 200-3, and 200-X in FIG. 2). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Figure 1:
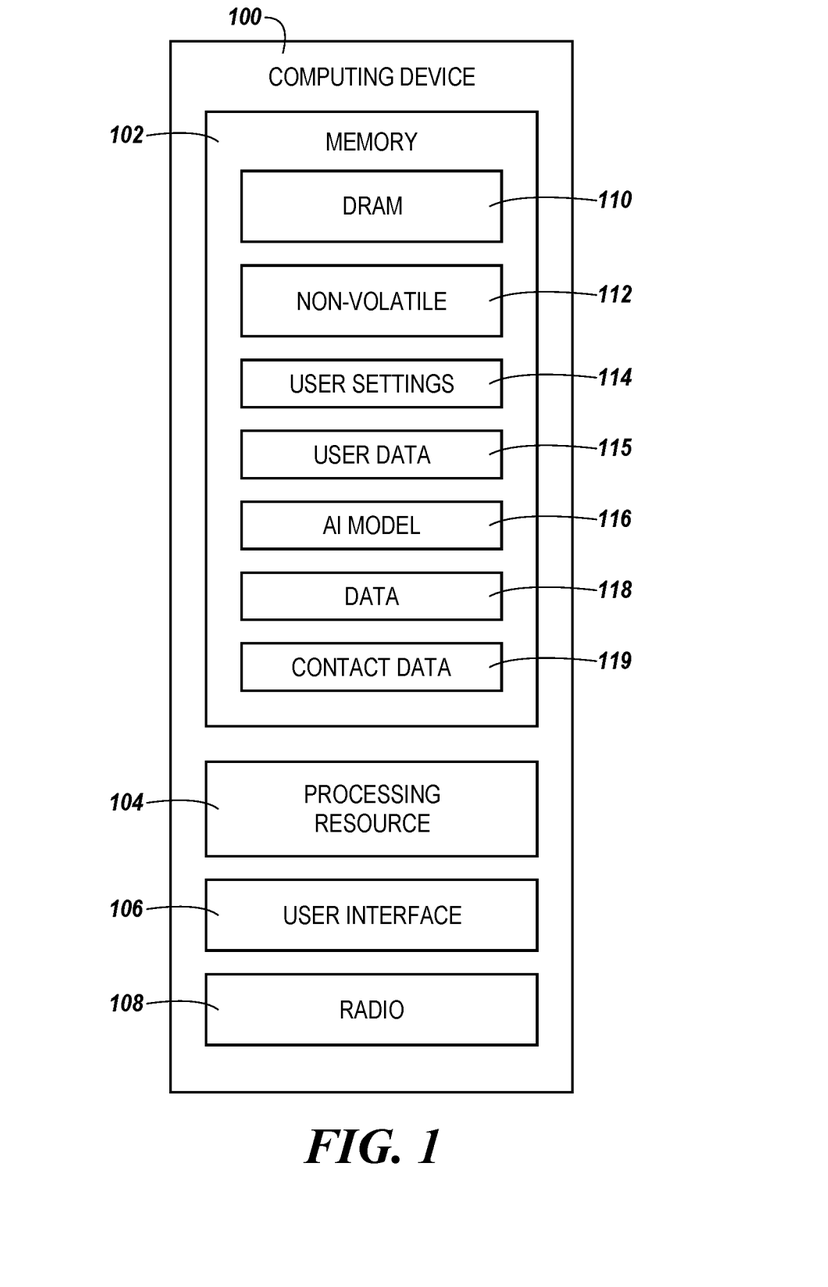
FIG. 1 illustrates an example of a computing device for sharing data in accordance with a number of embodiments of the present disclosure.

FIG. 1 illustrates an example of a computing device 100 for sharing data in accordance with a number of embodiments of the present disclosure. The computing device 100 can be, but is not limited to, a smartphone, a wearable device, a tablet, a laptop, a desktop computer, a smart assistant device, or any combination thereof.

A memory 102, a processing resource 104, a user interface 106, and/or a radio 108 can be included in and/or coupled to the computing device 100. The memory 102 can include standard memory (e.g., standard memory 338 in FIG. 3) and tiered memory (e.g., tiered memory 336 in FIG. 3). Tiered memory can include volatile and non-volatile memory to store data based on speed and efficiency demands for the data. DRAM 110 and/or non-volatile memory 112 can be included in the memory 102. In some examples, the non-volatile memory 112 can comprise NAND and/or 3D Cross-point.

The memory 102 can be coupled to the processing resource 104 and can store user settings 114, user data 115, an AI model 116, data 118, and/or a contact list 119. Data 118 can include a video, a video game, audio, an application, a document, message, and/or folder. The memory 102 can be any type of storage medium that can be accessed by the processing resource 104 to perform various examples of the present disclosure. For example, the memory 102 can be a non-transitory computer readable medium having computer readable instructions (e.g., computer program instructions) stored thereon that are executable by the processing resource 104 to write a first portion of data 118 to the DRAM 110 on the computing device 100, receive, via the radio 108 of the computing device 100, first signaling representing a request to share the first portion of data 118 via the processing resource 104 of the computing device 100 with a different processing resource of a different computing device, determine at the processing resource 104 of the computing device 100 to share the first portion of data 118 with the different processing resource of the different computing device based on at least one of: a command from a user or data representing user settings 114 stored in the non-volatile memory 112 on the computing device 100, and transmit, via the radio 108 of the computing device 100, second signaling comprising the first portion of data 118 to the different processing resource of the different computing device.

The user interface 106 can be generated by computing device 100 in response to one or more commands. The user interface 106 can be a graphical user interface (GUI) that can provide and/or receive information to and/or from the user of the computing device 100. In a number of embodiments, the user interface 106 can be shown on a display of the computing device 100.

A user can receive requests and/or transmit commands via the user interface 106. For example, the user interface 106 can display a request from a different computing device to share data, modify shared data, and/or delete shared data in response to the computing device 100 receiving the request. In response to displaying the request on the user interface 106, the user can ignore the request, select a command on the user interface 106, recite a command into a microphone of the computing device 100, and/or write a command via a keyboard or a touchscreen display of the computing device 100. For example, the computing device 100 can display a request to share data from another computing device with one or more selectable options on the user interface 106. The user can select to share data as one of the one or more selectable options on the user interface 106 and the computing device 100 can transmit the requested data to the different computing device via the radio 108 in response to receiving the selection from the user. If the user did not select one of the one or more selectable options after a particular period of time the computing device 100 may not share the data and/or may remove the request from the user interface 106. In some examples, the received requests and the user commands can be stored as user data 115 in memory 102.

In a number of embodiments, user settings 114 can be inputted via user interface 106 and stored in memory 102. In some examples, the user settings 114 can be stored in the non-volatile memory 112. The user settings 114 can be entered by the user of computing device 100.

Contact data 119 can be entered by the user of computing device 100. The contact data 119 can include a contact's name, telephone number, email address, profession, relationship to the user, a contact's one or more computing devices (e.g., computing devices 220-1, 220-2, 220-3, . . . , 220-X in FIG. 2), and/or the one or more contact lists (e.g., contact lists 339-1, 339-2, 339-3, . . . , 339-Y) the contact is included in. A user can create a contact list for family members, for example, and select a number of contacts that are family members in the user settings 114. Other contact lists that the user can create can include acquaintances, coworkers, and/or friends, for example.

Instructions for the computing device 100 can be created and executed based on the user settings 114. The computing device 100 can display requests from another computing device, share data with another computing device, revoke access to shared data, modify shared data, and/or delete shared data based on the user settings 114 and/or contact data 119. For example, the computing device 100 can display requests from a different computing device, share data with the different computing device, and/or revoke access to the shared data if the different computing device belongs to a contact on a particular contact list. In some examples, the computing device 100 can receive a command to modify shared data, and/or delete shared data from a different computing device. The computing device 100 can perform the command to modify and/or delete shared data or ignore the command to modify and/or delete shared data in response to the user settings and/or the different computing device belonging to a contact on a particular contact list.

The processing resource 104 can include components configured to enable the computing device 100 to perform AI operations. In some examples, AI operations may include training operations or interference operations, or both. In a number of embodiments, the AI model 116 can be trained remotely in a cloud using sample data and transmitted to the computing device 100.

In some examples, user settings 114, and/or contact data 119 can be determined using the AI model 116. User data 115 can be inputted into the AI model 116. User data 115 can include user commands (e.g., responses) to particular contacts and to requests to share data, modify shared data, and/or delete shared data. For example, the computing device 100 can input a user's previous commands into the AI model 116. The computing device 100 can determine and set user settings 114 at least partially based on an output of the AI model 116. An AI operation to determine and update user settings can be periodic and/or in response to a user entering a command.

The computing device 100 can receive and/or transmit requests, commands, and/or data via radio 108. The radio 108 can communicate via a network relationship through which the computing device 100 communicates with one or more other computing devices, wearable devices, telephones, sensors, smart assistants, and/or cloud computing devices. Examples of such a network relationship can include Bluetooth, AirDrop, a peer-to-peer Wi-Fi network, a cellular network, a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. In a number of embodiments, the computing device 100 can receive and/or transmit requests, commands, and/or data using Bluetooth when the computing device 100 has poor or no internet connection.

Figure 2:
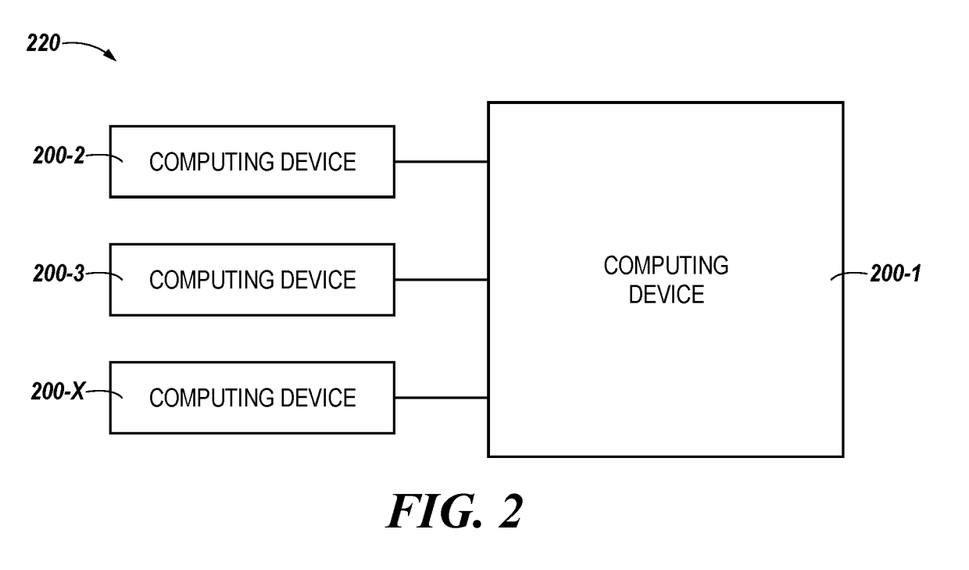
FIG. 2 illustrates an example of a system for sharing data between computing devices in accordance with a number of embodiments of the present disclosure.

FIG. 2 illustrates an example of a system 220 for sharing data between computing devices 200-1, 200-2, 200-3, ..., 200-X in accordance with a number of embodiments of the present disclosure. The system 220 can include one or more computing devices 200-1, ..., 200-X, which can correspond to computing device 100 in FIG. 1. The one or more computing devices 200-1, ..., 200-X can be wearable devices, smartphones, tablets, laptops, desktop computers, smart assistants, or any combination thereof and each of the one or more computing devices 200-1, ..., 200-X can include a memory, a processing resource, a user interface, and a radio, as previously described in connection with FIG. 1.

Each of the number of computing devices 200-1, ..., 200-X can be a associated with a contact. Contact data can include a contact's name, telephone number, email address, profession, relationship to the user, and/or the one or more contact lists the contact is included in. A portion or all of the contact data can be received at a computing device of the number of computing devices 200-1, ..., 200-X from a different computing device of the number of computing devices 200-1, ..., 200-X. A portion or all of the contact data (e.g., contact data 119 in FIG. 1) can be created by the user of the computing device of the number of computing devices 200-1, ..., 200-X, and/or a portion or all of the contact data can be determined by the computing device of the number of computing devices 200-1, ..., 200-X using an AI model (e.g., AI model 116 in FIG. 1), as previously described in connection with FIG. 1.

A computing device of the number of computing devices 200-1, ..., 200-X can share data with a different computing device of the number of computing devices 200-1, ..., 200-X if the different computing device belongs to a contact on a particular contact list. For example, computing device 200-2 may request data from computing device 200-1 and computing device 200-3 may also request data from computing device 200-1. The computing device 200-1 may transmit data to computing device 200-2 and may not transmit data to computing device 200-3 because computing device 200-2 is included in a first contact list that the user has approved to share data with and computing device 200-3 is included in a second contact list that the user has not approved to share data with.

In some examples, computing device 200-1 determines whether data can be shared based on the portion of data requested. For example, the computing device 200-1 may transmit a portion of data to computing device 200-2 and may not transmit the portion of data to computing device 200-3 because computing device 200-2 is included in a first contact list that the user has approved to share the portion of data with and computing device 200-3 is included in a second contact list that the user has not approved to share the portion of data with.

A computing device of the number of computing devices 200-1, ..., 200-X can revoke access to shared data if the different computing device belongs to a contact on a particular contact list, if the different computing device is performing unauthorized operations, and/or if the user inputs a command to revoke access to the shared data. For example, a transmission of data from computing device 200-1 to computing device 200-2 can be terminated in response to computing device 200-2 modifying and/or attempting to modify the data when computing device 200-2 does not have authorization from computing device 200-1 to modify the data.

In some examples, a computing device of the number of computing devices 200-1, ..., 200-X can receive a command to modify shared data, and/or delete shared data from a different computing device. The computing device of the number of computing device 200-1, ..., 200-X can perform the command to modify and/or delete shared data or ignore the command to modify and/or delete shared data in response to user settings and/or the different computing device belonging to a contact on a particular contact list. For example, computing device 200-1 can receive a command from computing device 200-2 to delete shared data and receive a command from computing device 200-3 to delete shared data and the computing device 200-1 may delete shared data in response to the command from computing device 200-2 which is included in a first contact list and may ignore the command from computing device 200-3 which is included in a second contact list.

Figure 3:
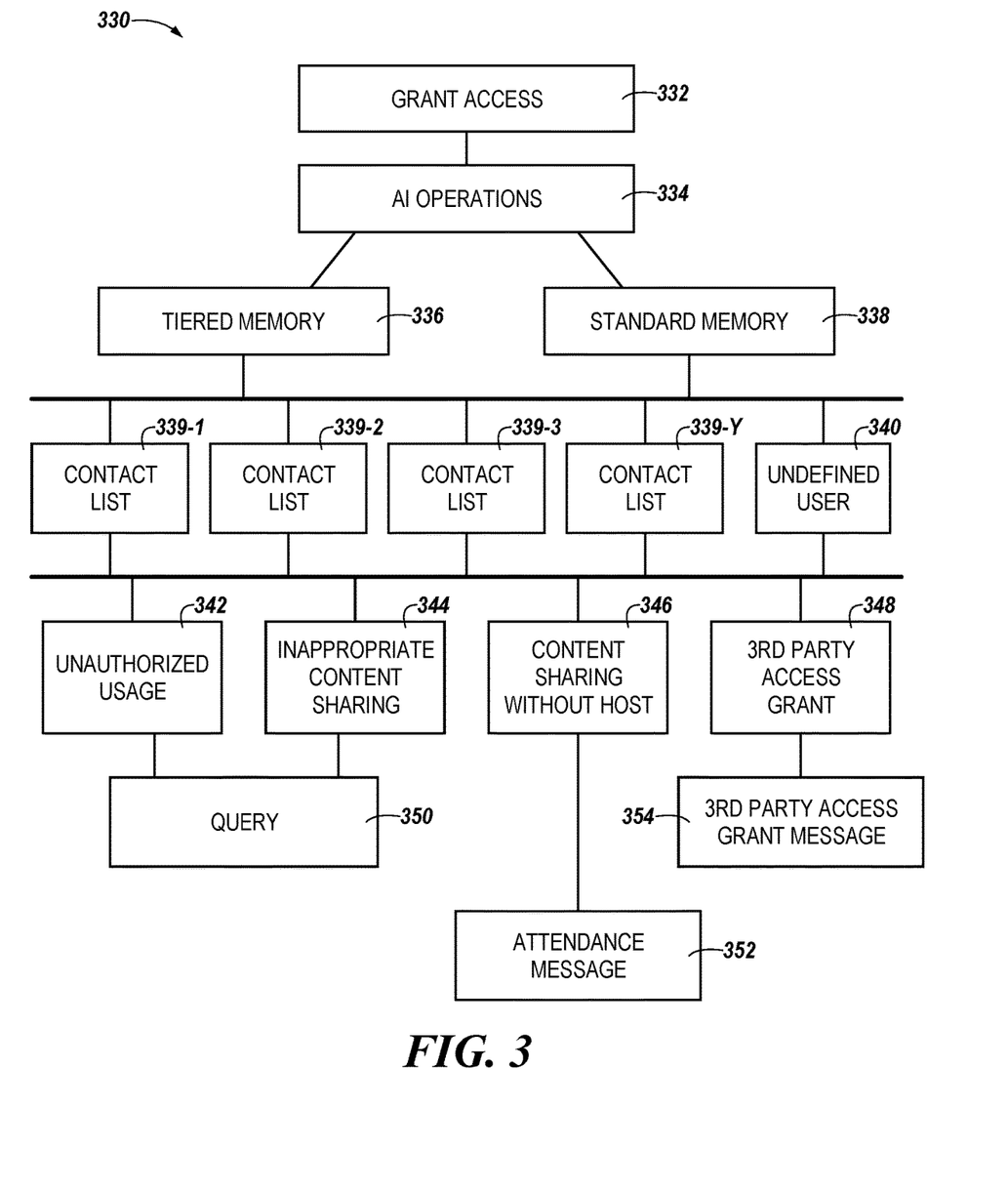
FIG. 3 illustrates an example flow diagram of sharing data between computing devices in accordance with a number of embodiments of the present disclosure.

FIG. 3 illustrates an example flow diagram 330 of sharing data between computing devices (e.g., computing devices 200-1, ..., 200-X in FIG. 2) in accordance with a number of embodiments of the present disclosure. A user of a computing device (e.g., computing device 200-1 in FIG. 2) can grant access 332 permanently or temporarily to all or a portion of data stored in memory on the computing device to another computing device (e.g., computing device 200-2 in FIG. 2). In some examples, the computing device can grant access 332 permanently or temporarily to all or a portion of data stored in memory on the computing to another computing device in response to performing AI operations 334.

The computing device can perform AI operations 334 using an AI model (e.g., AI model 116 in FIG. 1). AI operations 334 can determine what data another computing device can receive, modify, and/or delete from the computing device. User data (e.g., user data 115) and contact data (e.g., contact data 119 in FIG. 1) can be inputted into the AI model.

User data can include historical data including user commands in response to requests to share data, modify shared data, and/or delete shared data. For example, the computing device can input a user's previous commands into the AI model and the AI model can determine whether or not to allow another computing device to receive, modify, and/or delete data from the computing device based on a user's previous commands.

The contact data can include a contact's name, telephone number, email address, age, geographical location, profession, relationship to the user, a contact's one or more computing devices, and/or the one or more contact lists the contact is included in. In some examples, the contact list can predefine days, time, or events when the other computing device can receive, modify, and/or delete data from the computing device. The computing device can input the contact data into the AI model and the AI model can determine whether to allow another computing device to receive, modify, and/or delete data from the computing device based on the contact data.

In a number of embodiments, the AI model can determine where to store particular data. Data can be stored in tiered memory 336 and/or in standard memory 338. DRAM and non-volatile memory can be included in tiered memory. The non-volatile memory can include NAND and/or 3D Crosspoint.

Data required for non-critical and/or less demanding operations can be stored in the standard memory 338 and data needed for critical and more demanding operations can be stored in the tiered memory 336 to ensure a greater user experience. For example, streaming a video from a computing device to a number of other computing devices can demand a higher processor and memory efficiency and speed and using the tiered memory 336 to store the video data prior to transmitting the video data can allow the computing device to meet that demand.

Data can be stored in standard memory 338 or tiered memory 336 based on the category of data. Categories can include videos, video games, audio, messages, applications, folders, and/or documents, for example. In some examples, the AI model can determine the category of the data based on metadata and/or the size of the data. The AI model can determine where the data should be stored based on the category. In a number of embodiments, the AI model can output a command to write data including a video, a video game, audio, and/or an application to the DRAM and/or data including a photo, document, message, and/or folder to non-volatile memory.

A user can create one or more contact lists 339-1, 339-2, 339-3, . . . , 339-Y and select one or more contacts to be included in each of the one or more contact lists 339-1, . . . , 339-Y. For example, contacts included in contact list 339-1 can be granted access to certain data, for instance, photos, contact lists, YouTube, Facebook, and/or Instagram. Contacts included in contact list 339-2 can be granted limited content access to, for example, age appropriate content. Contacts included in contact list 339-3 can be granted access to predefined applications and/or data on predefined days, times, or events, for example. Contacts included in contact list 339-Y can be granted access once and then deleted from the contact list. Undefined users 340 can be denied access. Undefined users 340 can be identified based on their location and/or their phone number, for example. In some examples, a computing device that is not included on the number of contact lists 399-1, . . . , 399-Y can be determined to be an undefined user 340.

Once data is transmitted, unauthorized usage 342 of data and/or applications can be identified. The AI model can be trained based on the user data to determine what actions are unauthorized usage 342. Unauthorized usage 342 can include modifying and/or deleting data.

In a number of embodiments, once data is transmitted, inappropriate content sharing 344 can be identified. The AI model can be trained based on the user data to determine when inappropriate content sharing 344 is occurring. Inappropriate content sharing 344 can include accessing unapproved data and/or applications.

In response to operations determined to be unauthorized usage 342 and/or inappropriate content sharing 344 the AI model can output a command to stop the unauthorized usage 342 and/or the inappropriate content sharing 344. In some examples, the AI model can output a command to query 350 a user of the computing device. The query can ask the user whether the operation that was determined to be unauthorized usage 342 and/or inappropriate content sharing 344 by the AI model is actually appropriate. The user's response to the query 350 can be stored as user data and can be inputted into the AI model to continue training the AI model. In some examples, in response to the user's response that the operation is appropriate, the AI model can output a command to allow the operations to resume.

In a number of embodiments, the computing device can continue content sharing without a host 346. For example, the computing device and another computing device can be presenting the same audio, photo, video, video game, message, document, application, and/or folder streamed from the computing device and the other computing device can continue to present the audio, photo, video, video game, message, document, application, and/or folder even when the computing device is no longer presenting the audio, photo, video, video game, message, document, application, and/or folder.

In some examples, the computing device and/or one of the other computing devices can leave the group and stop presenting the same audio, photo, video, video game, message, document, application, and/or folder. The AI model can determine the computing device and/or one of the other computing devices has stopped presenting and the AI model can send an attendance message 352 to the computing device and/or the other computing devices that the computing device and/or the other computing device has stopped presenting. In a number of embodiments, the AI model can determine when a computing device has joined the group in presenting the same audio, photo, video, video game, message, document, application, and/or folder and send an attendance message 352 notifying the other computing devices in the group.

A third-party access grant 348 can include a second computing device giving a third computing device access to a first computing device. For example, the second computing device can transmit data from the first computing device to the third computing device.

In some examples, the AI model can determine the second computing device is sharing the data of the first computing device with a third computing device and in response, the AI model can output a third party access grant message 354 to notify the user of the first computing device that access is being given to a new computing device. The message can include data about the third computing device, including, for example, a phone number associated with the computing device.

Figure 4:
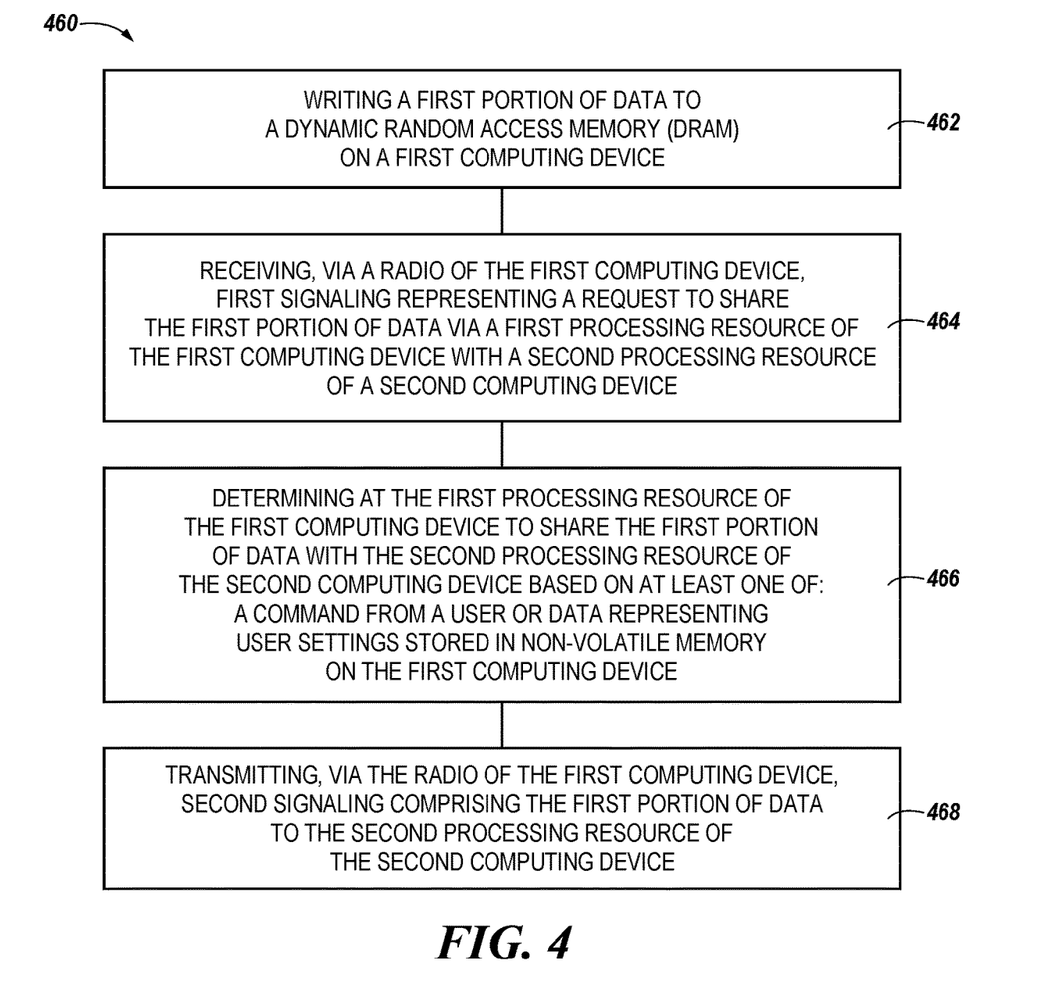
FIG. 4 is a flow diagram of a method for sharing data between computing devices in accordance with a number of embodiments of the present disclosure.

FIG. 4 is a flow diagram of a method 460 for sharing data between computing devices in accordance with a number of embodiments of the present disclosure. At block 462, the method 460 can include writing a first portion of data to a DRAM on a first computing device. The DRAM can be included in tiered memory. The first portion of data can comprise a document, a photo, a message, a folder, a video, a video game, audio, and/or an application, for example.

At block 464, the method 460 can include receiving, via a radio of the first computing device, first signaling representing a request to share the first portion of data via a first processing resource of the first computing device with a second processing resource of a second computing device. The first computing device can send and/or receive data from other computing devices, including the second computing device, via communication devices, such as, but not limited to a radio. Signaling including the first signaling can include a radio signal that carries data from one location to another.

At block 466, the method 460 can include determining at the first processing resource of the first computing device to share the first portion of data with the second processing resource of the second computing device based on at least one of: a command from a user or data representing user settings stored in non-volatile memory on the first computing device. In a number of embodiments, a user can provide commands, user settings, and/or data via a user interface. For example, the user can provide an approval to share the first portion of data and/or provide user settings for sharing data via the user interface.

At block 468, the method 460 can include transmitting, via the radio of the first computing device, second signaling comprising the first portion of data to the second processing resource of the second computing device. The request can include credentials of the second computing device. In some examples, credentials can include a serial number of the second computing device and/or an email, phone number, and/or address associated with the second computing device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    writing a first portion of data to a dynamic random access memory (DRAM) on a first computing device;
    receiving, via a radio of the first computing device using Bluetooth in response to no Internet connection, first signaling representing a request to share the first portion of data via a first processing resource of the first computing device with a second processing resource of a second computing device;
    determining at the first processing resource of the first computing device to share the first portion of data with the second processing resource of the second computing device based on at least one of: a command from a user or data representing user settings stored in non-volatile memory on the first computing device;
    transmitting, via the radio of the first computing device using Bluetooth in response to no Internet connection, second signaling comprising the first portion of data comprising at least one of: a photo, a video, a video game, or audio to the second processing resource of the second computing device; and
    revoking access to the first portion of data, via the first computing device, at the second computing device.

2. The method of claim 1, further comprising:
    receiving third signaling representing the request to share the first portion of data at a user interface of the first computing device;
    displaying the request to share the first portion of data at the user interface of the first computing device;
    receiving fourth signaling comprising the command from the user in response to displaying the request to share the first portion of data; and
    transmitting, via the radio of the first computing device, the second signaling comprising the first portion of data to the second processing resource of the second computing device in response to receiving the third signaling.

3. The method of claim 1, further comprising receiving data representing credentials of the second computing device in the first signaling representing the request to share the first portion of data.

4. The method of claim 3, further comprising:
    storing data representing credentials of a number of computing devices on a contact list in the non-volatile memory of the first computing device;
    comparing at the first processing resource the data representing the credentials of the second computing device with the data representing the credentials of the number of computing devices; and
    determining at the first processing resource of the first computing device to share the first portion of data with the second processing resource of the second computing device at least partially based on comparing the data representing the credentials of the second computing device with the data representing the credentials of the number of computing devices.

5. The method of claim 4, further comprising:
    matching the data representing the credentials of the second computing device with data representing a credential of one of the number of computing devices on the contact list; and
    transmitting, via the radio of the first computing device, the second signaling comprising the first portion of data to the second processing resource of the second computing device in response to matching the data representing the credentials of the second computing device with the data representing the credential of one of the number of computing devices on the contact list.

6. The method of claim 1, further comprising:
    receiving third signaling representing the user settings at the first processing resource of the first computing device from a user interface; and storing the user settings in the non-volatile memory of the first computing device in response to receiving the third signaling.

7. The method of claim 1, further comprising:
receiving, via the radio of the first computing device, third signaling comprising a command to delete the first portion of data at the first processing resource of the first computing device from the second processing resource of the second computing device; and
ignoring the command to delete the first portion of data at the first processing resource of the first computing device at least partially based on the user settings.

8. The method of claim 1, further comprising:
receiving, via the radio of the first computing device, third signaling comprising a command to modify the first portion of data at the first processing resource of the first computing device from the second processing resource of the second computing device; and
ignoring the command to modify the first portion of data at the first processing resource of the first computing device at least partially based on the user settings.

9. The method of claim 1, further comprising:
receiving, via the radio of the first computing device, third signaling comprising a command to delete the first portion of data at the first processing resource of the first computing device from the second processing resource of the second computing device; and
deleting the first portion of data at least partially based on the user settings in response to receiving the third signaling.

10. The method of claim 1, further comprising:
receiving, via the radio of the first computing device, third signaling comprising a command to modify the first portion of data at the first processing resource of the first computing device from the second processing resource of the second computing device; and
modifying the first portion of data at least partially based on the user settings in response to receiving the third signaling.

11. An apparatus, comprising:
memory including dynamic random access memory (DRAM) and non-volatile memory;
a user interface;
a radio; and
a first processing resource coupled to the memory, the user interface, and the radio, wherein the first processing resource is configured to:
  write a first portion of data to the DRAM;
  receive, via the radio using Bluetooth in response to no Internet connection, first signaling representing a request to share the first portion of data from a second processing resource;
  receive second signaling including a command from the user interface;
  transmit, via the radio using Bluetooth in response to no Internet connection, third signaling comprising the first portion of data comprising at least one of: a photo, a video, a video game, or audio to the second processing resource in response to receiving the second signaling; and
  revoke access to the first portion of data.

12. The apparatus of claim 11, wherein the first processing resource is configured to:
  transmit fourth signaling representing the request to share the first portion of data to the user interface; and
  display the request on the user interface in response to receiving the fourth signaling.

13. The apparatus of claim 12, wherein the first processing resource is configured to receive the second signaling representing the command from a user in response to displaying the request on the user interface and wherein the first processing resource is configured to continue to transmit third signaling comprising the first portion of data to the second processing resource in response to the user interface no longer displaying the first portion of data.

14. The apparatus of claim 11, wherein the first processing resource is configured to:
  receive fourth signaling representing another command from the user interface; and
  terminate transmitting third signaling in response to receiving the fourth signaling.

15. An apparatus, comprising:
a tiered memory including dynamic random access memory (DRAM) and non-volatile memory;
a user interface;
a radio; and
a first processing resource coupled to the tiered memory, the user interface, and the radio, wherein the first processing resource is configured to:
  write a first portion of data to the DRAM or the non-volatile memory at least partially based on a category of the first portion of data;
  receive, via the radio using Bluetooth in response to no Internet connection, first signaling representing a request to share the first portion of data from a second processing resource;
  transmit, via the radio using Bluetooth in response to no Internet connection, third signaling comprising the first portion of data comprising at least one of: a photo, a video, a video game, or audio to the second processing resource in response to receiving the first signaling; and
  revoke access to the first portion of data.

16. The apparatus of claim 15, wherein the first portion of data is written to the DRAM in response to the first portion of data comprising the video.

17. The apparatus of claim 15, wherein the first portion of data is stored in the non-volatile memory in response to the first portion of data comprising the photo.

* * * * *